US010568138B2

(12) United States Patent
Patwardhan et al.

(10) Patent No.: US 10,568,138 B2
(45) Date of Patent: Feb. 18, 2020

(54) BLUETOOTH LOW ENERGY SIGNAL PATTERNS

(71) Applicant: Hewlett Packard Enterprise Development LP, Houston, TX (US)

(72) Inventors: Gaurav Patwardhan, Santa Clara, CA (US); Ankur Kamthe, Santa Clara, CA (US); Eldad Perahia, Portland, OR (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/795,826

(22) Filed: Oct. 27, 2017

(65) Prior Publication Data

US 2019/0132873 A1 May 2, 2019

(51) Int. Cl.
*H04W 4/80* (2018.01)
*H04W 74/08* (2009.01)
*H04W 72/12* (2009.01)
*H04W 80/02* (2009.01)
*H04W 8/00* (2009.01)
*H04W 88/06* (2009.01)
*H04W 84/12* (2009.01)

(52) U.S. Cl.
CPC ....... *H04W 74/0816* (2013.01); *H04W 8/005* (2013.01); *H04W 72/1215* (2013.01); *H04W 74/0825* (2013.01); *H04W 80/02* (2013.01); H04W 4/80 (2018.02); H04W 84/12 (2013.01); H04W 88/06 (2013.01)

(58) Field of Classification Search
CPC ............. H04W 74/0816; H04W 8/005; H04W 74/0825; H04W 72/1215; H04W 4/80; H04W 84/12; H04W 80/02
See application file for complete search history.

(56) References Cited

U.S. PATENT DOCUMENTS

| 8,331,289 | B1 * | 12/2012 | Lee ........................ H04B 1/006 370/328 |
| 2010/0322287 | A1 * | 12/2010 | Truong ............. H04W 72/1215 375/133 |
| 2012/0327920 | A1 | 12/2012 | Xhafa et al. |
| 2013/0170480 | A1 | 7/2013 | Novak et al. |

(Continued)

FOREIGN PATENT DOCUMENTS

| EP | 2481204 A1 | 8/2012 |
| WO | 2012/019564 A1 | 2/2012 |

OTHER PUBLICATIONS

Chiasserini, C.F., et al. "Coexistence mechanisms for interference mitigation between IEEE 802.11 WLANs and Bluetooth"; 2002; 9 pages.

(Continued)

*Primary Examiner* — Chuong A Ngo
(74) *Attorney, Agent, or Firm* — Brooks, Cameron & Heubsch, PLLC (57) ABSTRACT

An example computing device, comprising: a processing resource; and a memory resource storing machine readable instructions to cause the processing resource to: determine when known pattern indicates a pattern of a Bluetooth low energy (BLE) signal in relation to a channel to be occupied by the BLE signal; and adjust a channel for a wireless local area network (WLAN) transmission based on the determination.

17 Claims, 4 Drawing Sheets

(56) References Cited

U.S. PATENT DOCUMENTS

| | | |
|---|---|---|
| 2015/0215950 A1 | 7/2015 | Amini et al. |
| 2016/0360559 A1 | 12/2016 | Chrisikos et al. |
| 2017/0126262 A1 | 5/2017 | Zakaria et al. |
| 2017/0142721 A1 | 5/2017 | Azizi et al. |
| 2018/0123749 A1* | 5/2018 | Azizi .................... H04L 5/0044 |
| 2018/0124732 A1* | 5/2018 | Kamthe ................ H04W 24/10 |

OTHER PUBLICATIONS

Sven Zacharias et al: "Coexistence measurements and analysis of IEEE 802.15.4 with Wi-Fi and bluetooth for vehicle networks", ITS Telecommunications (ITST), 2012 12th International Conference on, IEEE, Nov. 5, 2012 (Nov. 5, 2012), pp. 785-790, XP032327908, DOI: 10.1109/ITST.2012.6425289 ISBN: 978-1-4673-3071-8.
European Search Report and Search Opinion Received for EP Application No. 18196475.0, dated Mar. 21, 2019, 13 pages.

* cited by examiner

FIG. 4

BLUETOOTH LOW ENERGY SIGNAL PATTERNS

BACKGROUND

Wireless networks may provide various types of communication to multiple users through the air using electromagnetic waves. As a result, various types of communication may be provided to users without cables, wires, or other physical electric conductors to couple devices in the wireless network. Examples of the various types of communication that may be provided by wireless networks include voice communication, data communication, multimedia services, etc. Wireless networks may include access points (APs), which may communicate with each other to detect other APs and/or user devices.

DETAILED DESCRIPTION

An example of a wireless network is a wireless local area network (WLAN). As used herein, the term "wireless local area network (WLAN)" can, for example, refer to a communications network that links two or more devices using some wireless distribution method (for example, spread-spectrum or orthogonal frequency-division multiplexing radio), and usually providing a connection through an access point to the Internet; and thus, providing mobile computing devices with the mobility to move around within a local coverage area and still stay connected to the network. WLANs may include multiple stations (STAs), controllers (e.g., WLAN controller(s)), and/or access points (APs) that may communicate over wireless channels. An AP may be a networking hardware device that allows a wireless-compliant device (e.g., a STA) to connect to a network, while a controller may perform configuration operations and/or authentication operations on APs and/or STAs.

The STAs and/or APs may include a radio to communicate and/or exchange information over the wireless channels. Information may be transmitted as a message, namely a collection of bits in a predetermined format. One type of message, namely a wireless message, includes a header and payload data having a predetermined number of bits of information. The wireless message may be placed in a format such as packets, frames, or cells. As used herein, the term "radio" can, for example, refer to an antenna or aerial which converts electric power into electromagnetic waves and vice versa.

An AP may provide connectivity with a network such as the Internet to the STAs. As used herein, the term "AP" can, for example, refer to receiving points for known or convenient wireless technology which may later become known. Specifically, the term AP is not intended to be limited to Institute of Electrical and Electronics Engineers (IEEE) 802.11-based APs. An AP generally functions as an electronic device that is adapted to allow wireless devices to connect to a wired network via various communications standards. As used herein, the term "STA" can, for example, refer to a device that has the capability to use the Institute of Electrical and Electronics Engineers (IEEE) 802.11 protocol. Examples of STAs include smart phones, laptops, physical non-virtualized computing devices, personal digital assistants, etc. In some examples, a STA may be a device that contains an IEEE 802.11-conformant media access control (MAC) and physical layer (PHY) interface to a wireless medium (WM). As used herein, the term "controller" can, for example, refer to a WLAN controller that performs load balancing operations, authentication operations, interference detection and avoidance operations, and/or coverage hole detection and correction operations for the network.

Wireless networks such as WLANs can use various wireless communication technologies. In some examples, WLANs can use orthogonal frequency division multiplexing (OFDM). In an OFDM based wireless network, a data stream is split into multiple data substreams. Such data substreams may be sent over different OFDM subcarriers, which can be referred to as tones or frequency tones. Some wireless networks may use a single-in-single-out (SISO) communication approach, where each STA and/or AP uses a single antenna. Other wireless networks may use a multiple-in-multiple-out (MIMO) communication approach, where a STA and/or AP uses multiple transmit antennas and multiple receive antennas. For example, some wireless networks may include controllers, APs, and/or STAs that may be used to facilitate communication in the network. Such networks may allow for multiple user (MU) MIMO communication. WLANs such as those defined in the IEEE wireless communications standards (e.g., IEEE 802.11a, IEEE 802.11n, IEEE 802.11ac, etc.), can use OFDM to transmit and receive signals. Moreover, WLANs, such as those based on the IEEE 802.11n or IEEE 802.11ac standards, can use OFDM and MIMO.

An AP may further include a Bluetooth low energy (BLE) communicator, which may transmit and/or receive a BLE signal with other device. BLE communicator is a beacon sensor device that uses BLE technology. For example, the BLE communicator as a beacon sensor device may facilitate connection with network devices by sending advertisement data frames.

A beacon sensor device, such as a BLE device, refers to any type of device capable of transmitting and receiving advertisements and responses. A BLE device can broadcast an identifier to neighboring devices such as a client device or another BLE device. As used herein, a client device can, for example, refer to a device including a processing resource, memory, and input/output interfaces for wired and/or wireless communication. A client device may include a laptop computer, a desktop computer, a mobile device, and/or other wireless devices, although examples of the disclosure are not limited to such devices. A mobile device may refer to devices that are (or may be) carried and/or worn by a user. For instance, a mobile device can be a phone (e.g., a smart phone), a tablet, a personal digital assistant (PDA), smart glasses, and/or a wrist-worn device (e.g., a smart watch), among other types of mobile devices.

In some examples, the access point including both a radio for WLAN transmissions (e.g., transmitting information via the WLAN) and a radio for a BLE signal transmission, a BLE signal and a WLAN signal may often be transmitted over a same range of frequencies. For example, an 802.11ax-based access point may utilize channels (e.g., frequency channels) over spectrum of 2.4 GHz (e.g., from 2402 MHz to 2480 MHz) for both the WLAN transmission and the BLE signal transmission. As such, one type of transmission may often interfere with another type of transmission. For example, the WLAN transmission having a higher power (e.g., 15 dBm) than that of the BLE signal transmission (e.g., 0 dBm) may often interfere the BLE signal transmission.

Accordingly, the disclosure is directed to utilizing BLE signal patterns. For example, examples of the disclosure may include a computing device including a processing resource and a memory resource storing instructions to cause the processing resource to determine when known pattern indicates a pattern of a BLE signal in relation to a channel to be occupied by the BLE signal, and adjust a channel for a WLAN transmission based on the determination. As such, examples of the disclosure can increase chances of avoiding interference between the WLAN transmission and the BLE signal transmission while further providing mechanisms to perform those simultaneously over different channels. As used herein, the term "a BLE" or "Bluetooth" may interchangeably refer to a wireless technology standard for exchanging data using, for example, ultra high frequency (UHF) waves in the industrial, scientific, and medical (ISM) radio band from 2.4 to 2.485 GHz.

Figure 1:
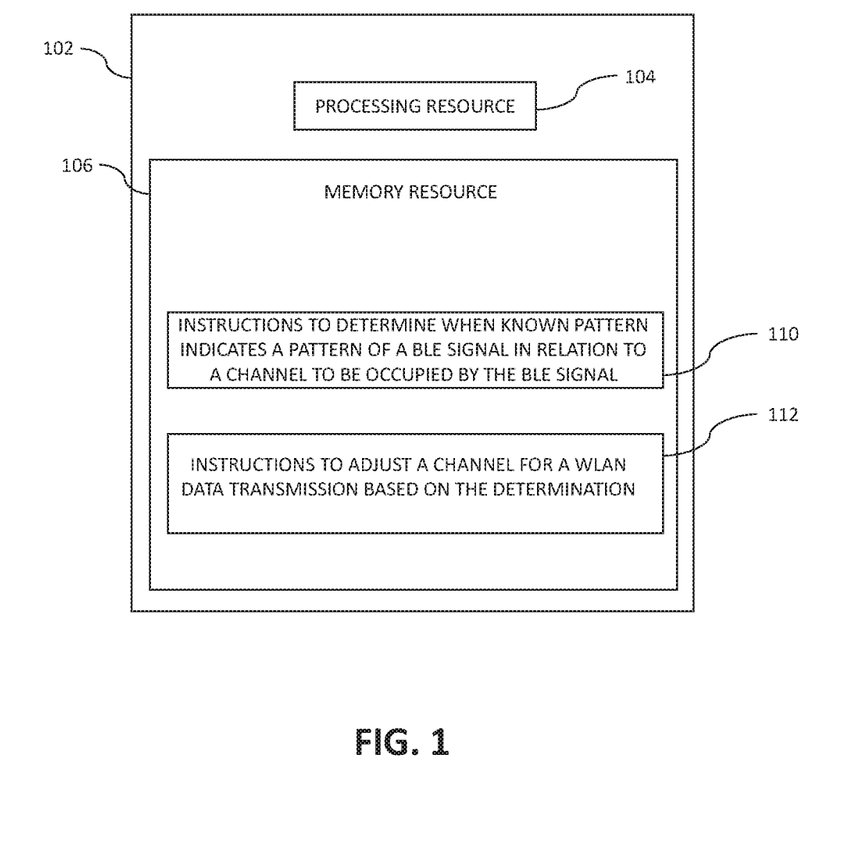
FIG. 1 illustrates an example of a computing device for utilizing a Bluetooth low energy (BLE) signal pattern consistent with the present disclosure.

FIG. 1 illustrates an example of a computing device 102 for a BLE signal pattern consistent with the present disclosure. In some examples, the computing device 102 can include a memory resource 106 that can be utilized to store instructions 110, 112, which can be executed by a processing resource 104 to perform functions described herein. Although examples are not so limited, the computing device may be an access point.

A processing resource 104 may be a Central Processing Unit (CPU), microprocessor, and/or other hardware device suitable for retrieval and execution of instructions stored in memory resource 106. In some examples, the processing resource 104 can be coupled to the memory resource 106 via a connection. The connection can be a physical or wireless communication connection. In the particular example shown in FIG. 1, processing resource 104 may receive, determine, and send instructions 110, 112. As an alternative, or in addition, to retrieving and executing instructions 110, 112, processing resource 104 may include an electronic circuit comprising a number of electronic components for performing the operations of the instructions 110, 112 in the memory resource 106. With respect to the executable instruction representations or boxes described and shown herein, it should be understood that part or all of the executable instructions 110, 112, and/or electronic circuits included within one box may be included in a different box shown in the figures or in a different box not shown.

Memory resource 106 may be any electronic, magnetic, optical, or other physical storage device that stores executable instructions 110, 112. Thus, memory resource 106 may be, for example, Random Access Memory (RAM), an Electrically-Erasable Programmable Read-Only Memory (EEPROM), a storage drive, an optical disc, and the like. The executable instructions 110, 112 may be stored on the memory resource 106. Memory resource 106 may be a portable, external or remote storage medium, for example, that allows the system to download the instructions 110, 112 from the portable/external/remote storage medium. In this situation, the executable instructions 110, 112 may be part of an "installation package". As described herein, memory resource 106 may be encoded with executable instructions 110, 112 for remote device.

In some examples, the memory resource 106 may include instructions 110 to determine when a known pattern indicates a pattern of a BLE signal. In some examples, the pattern may refer to a pattern of the BLE signal in relation to a channel to be occupied by the BLE signal. For example, the pattern may indicate how the BLE signal may behave on a particular channel and/or among a plurality of channels.

In some examples, the known pattern may indicate a duration during which a particular channel is to be occupied by the BLE signal. In some examples, the known pattern may indicate which particular channel is to be occupied by the BLE signal. In some examples, the known pattern may indicate how often the BLE signal is to be transmitted on a particular channel. These known patterns of the BLE signal may be provided to the computing device 102 prior to the BLE signal behaving according to the known patterns. For example, the known pattern may indicate that a particular channel is to be occupied by the BLE signal even prior to the particular channel being actually occupied by the BLE signal. As such, the computing device 102 may utilize the known pattern and indicate which channels may be available during a particular duration.

In some examples, the known pattern is known from a sequence of channels that the BLE communicator may utilize in transmitting and/or receiving BLE signals. For example, the BLE communicator, in communicating with another BLE communicator (for transmitting and/or receiving BLE signals), may utilize a plurality of channels and hop (e.g., switch) among the plurality of channels in transmitting the BLE signals over the plurality of channels. The BLE communicator, prior to transmitting and/or receiving the BLE signals, may communicate a sequence of channels another BLE communicator such that the sequence of channels are known to both BLE transmitter and BLE receiver.

In some examples, the sequence may be a pseudorandom sequence, which is generated from a particular seed. As used herein, a seed may refer to a random value. The random value may be a numeric value such that each value of the sequence (e.g., generated from the seed) may also be a numeric value. The pseudorandom sequence may be unpredictable without knowing the particular seed from which the pseudorandom sequence is generated. Stated differently, the pseudorandom sequence may be predictable when the same seed from which the pseudorandom sequence is generated is known. In some examples, the BLE communicator may utilize a particular seed to generate a pseudorandom sequence and the particular seed may be communicated (e.g., transmitted) to the computing system 102 (e.g., WLAN scheduler). As such, the computing system 102 may utilize the same seed and generate the same sequence such that the sequence being utilized for the BLE signal transmission is also known to the computing system 102 such as, for example, the WLAN scheduler.

In some examples, the memory resource 106 may include instructions 112 to adjust a channel for a WLAN transmission based on the determination. Since the computing system 102 knows which channel is to be occupied by the BLE signal based on the known pattern, the computing system 102 may select a channel for the WLAN transmission in a manner that does not interfere with the BLE transmission signals. For example, the computing system 102 may select, for a WLAN transmission, a channel that is not to be occupied by BLE signals at least while the channel is being occupied for the WLAN transmission. As such, examples of the disclosure provides benefits such as providing mechanisms to avoid interference between the WLAN transmission and the BLE signal transmission while performing those simultaneously.

Figure 2:
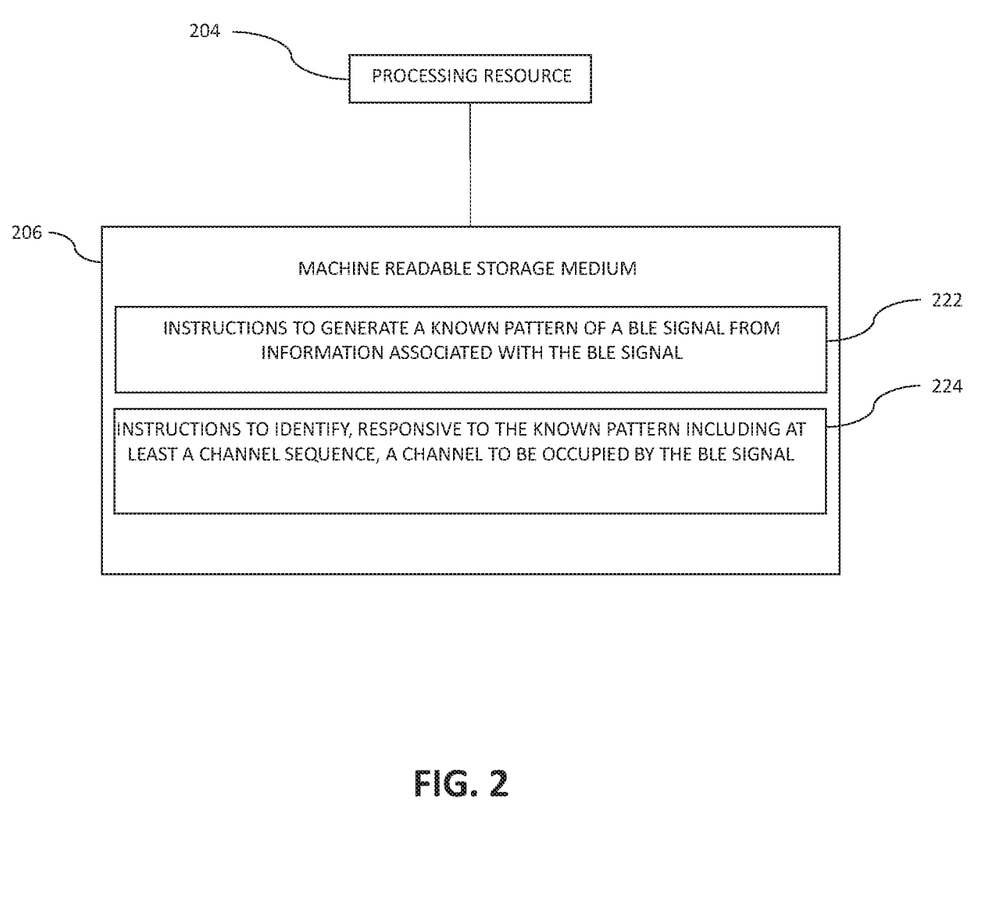
FIG. 2 illustrates a diagram of an example of a non-transitory machine-readable storage medium and processing resource for utilizing a BLE signal pattern consistent with the disclosure.

FIG. 2 illustrates a diagram of an example of a non-transitory machine-readable storage medium 206 and processing resource 204 for a BLE signal pattern consistent with the disclosure. In some examples, a machine-readable storage medium 206 may be utilized to store instructions 222, 224, that can be executed by a processing resource 204 to perform functions described herein.

A processing resource 204 may be a CPU, microprocessor, and/or other hardware device suitable for retrieval and execution of instructions stored in a machine-readable storage medium 206. In some examples, the processing resource 204 can be coupled to the machine-readable storage medium 206 via a connection. The connection can be a physical or wireless communication connection. In the particular example shown in FIG. 2, processing resource 204 may receive, determine, and send instructions 222 and 224. As an alternative, or in addition, to retrieving and executing instructions 222 and 224, processing resource 204 may include an electronic circuit comprising a number of electronic components for performing the operations of the instructions 222 and 224 in the machine-readable storage medium 206. With respect to the executable instruction representations or boxes described and shown herein, it should be understood that part or all of the executable instructions 222 and 224, and/or electronic circuits included within one box may be included in a different box shown in the figures or in a different box not shown.

Machine-readable storage medium 206 may be any electronic, magnetic, optical, or other physical storage device that stores executable instructions 222 and 224. Thus, machine-readable storage medium 206 may be, for example, RAM, an EEPROM, a storage drive, an optical disc, and the like. The executable instructions 222 and 224 may be stored on the machine-readable storage medium 206. Machine-readable storage medium 206 may be a portable, external or remote storage medium, for example, that allows the system to download the instructions 222 and 224 from the portable/external/remote storage medium. In this situation, the executable instructions 222 and 224 may be part of an "installation package". As described herein, machine-readable storage medium 206 may be encoded with executable instructions 222 and 224 for remote device configurations, as described herein.

Although the following descriptions refer to a single processing resource 204 and a single machine-readable storage medium 206, the descriptions may also apply to a system including multiple processing resources and multiple machine-readable storage mediums. In such examples, the medium 206 may be distributed across multiple machine readable storage mediums and multiple processing resources. Put another way, the instructions executed in the medium 206 may be stored across multiple machine-readable storage mediums and executed across multiple processing resources, such as in a distributed or virtual computing environment.

In some examples, the machine-readable storage medium 206 can include instructions 222 to generate a known pattern of a BLE signal from information associated with the BLE signal. The information from which the known pattern is generated may be received from a BLE communicator. For example, the information may be a seed (e.g., initial seed) utilized to generate a pseudorandom sequence. In some examples, the known pattern itself (already generated from the BLE communicator) may be received and utilized for a WLAN transmission.

In some examples the instructions 222 may further include instructions to generate the channel sequence from an initial seed of a pseudo random generator received from the BLE communicator. As described herein, the initial seed may be obtained from the BLE communicator. As used herein, a pseudo random generator may refer to a mechanism that maps a seed (e.g., initial seed) to a longer pseudorandom string (e.g., sequence) such that no statistical test can distinguish between an output of the generator and a uniform distribution. Stated differently, a sequence generated by the pseudo random generator may be known by possessing the seed and generate the sequence by utilizing the same pseudo random generator. As such, the initial seed obtained from the BLE communicator may be utilized such that the pseudorandom sequence being utilized, by the BLE communicator, for the BLE signal transmission is known.

In some examples, the machine-readable storage medium 206 can include instructions 224 to identify, responsive to the known pattern including at least a channel sequence, a channel to be occupied by the BLE signal. The channel sequence may be an order of channels on which the BLE signal is sequentially transmitted (e.g., pseudorandom sequence). As described herein, the channel sequence (of the known pattern) may be known based on the initial seed obtained from the BLE communicator.

In some examples, a BLE frequency-hopping spread spectrum (FHSS) may be utilized for a BLE signal transmission. As used herein, a FHSS may refer to a mechanism of transmitting signals (e.g., BLE signals) by switching a carrier among a plurality of frequency channels, for example, using a pseudorandom sequence known to both a signal transmitter and a signal receiver. As such, the instructions 224 may further includes instructions to track a plurality of channels among which the BLE signal may be dynamically transmitted responsive to the BLE FHSS.

In some examples, the machine-readable storage medium 206 can further include instructions to adjust, responsive to the channel identified to be occupied by the BLE signal, a channel for a WLAN transmission such that the channel adjusted for the WLAN transmission is separated from the channel to be occupied by the BLE signal. As such, utilizing a known pattern (e.g., of BLE signals) generated based on various types of information may provide benefits such as increasing accuracy that the known pattern predicts an actual transmission pattern of BLE signals.

In some examples, the machine-readable storage medium 206 can further include instructions to generate a BLE channel map indicating that a particular channel is reserved for a WLAN transmission and transmit, via a WLAN, data (e.g., information) over the particular channel regardless of the generated known pattern of the BLE signal. For example, a WLAN transmission may have a priority over a BLE signal transmission on a particular channel of a plurality of channels. In this event, rather than selecting a channel for the WLAN transmission based on a known pattern of the BLE signal transmission, the particular channel may be reserved for the WLAN transmission. This may be performed by providing, to the BLE communicator, a BLE channel map. The BLE channel map may indicate that the particular channel is reserved for the WLAN transmission and is not available for the BLE signal transmission. As such, the BLE communicator, in possession of the BLE channel map, may utilize the BLE channel map to communicate with other BLE devices in a manner that BLE signals being transmitted during the communication does not occupy the particular channel.

Figure 3:
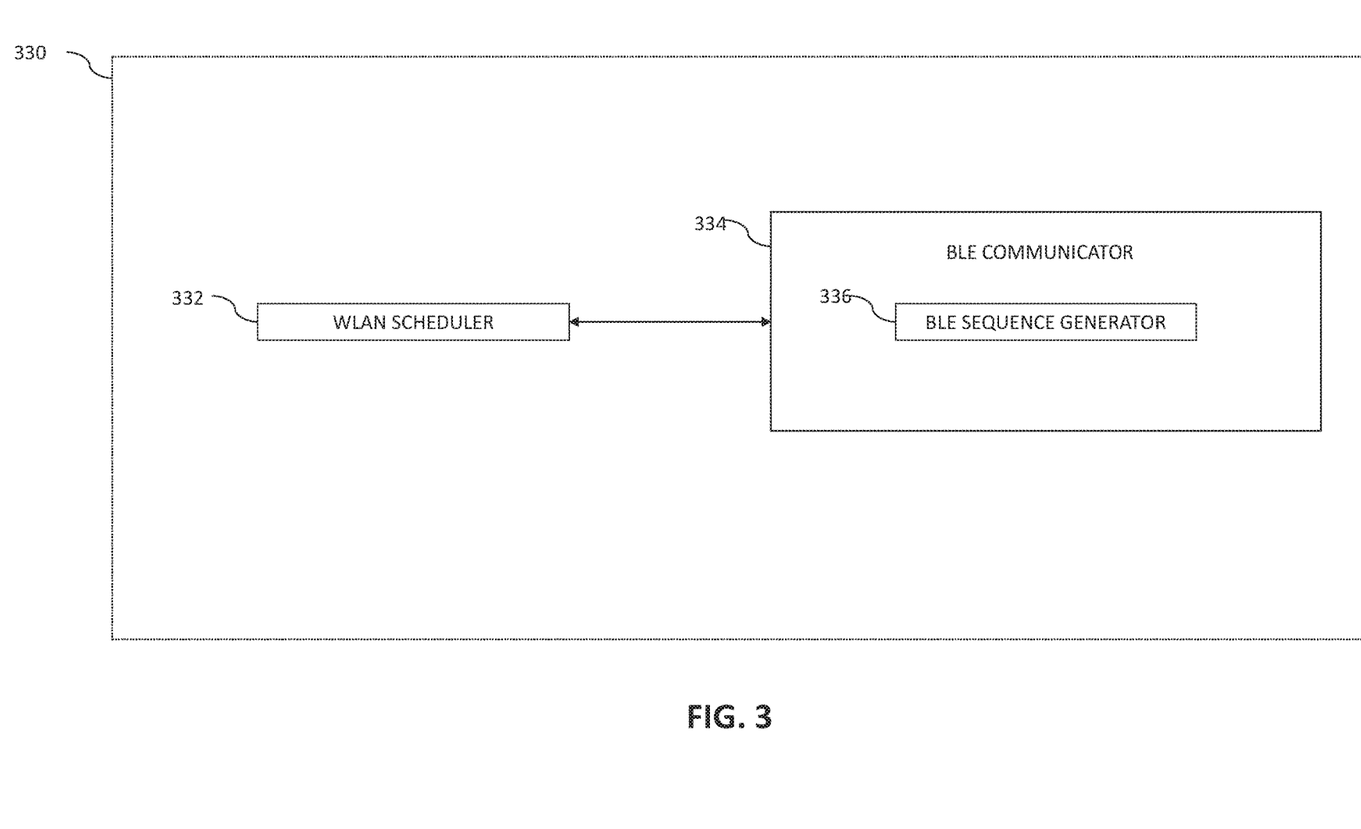
FIG. 3 illustrates an example of a system for utilizing a BLE signal pattern consistent with the present disclosure.

FIG. 3 illustrates an example of a system 330 for a BLE signal pattern consistent with the present disclosure. As shown in FIG. 3, the system 330 may include a WLAN scheduler 332 and a BLE communicator 334. In some examples, the system 330 may be a device such that the WLAN scheduler 332 and the BLE communicator 334 are included in the same device. For example, the system 330 may be an access point and/or a mobile device that may be able to perform both a WLAN transmission and a BLE signal transmission.

The BLE communicator 334 may include a BLE sequence generator 336 that generates, for examples, a pseudorandom sequence (e.g., of channels) such that the BLE communicator 334 may utilize the generated pseudorandom sequence for the BLE signal transmission. The WLAN scheduler 332 may schedule, direct, and/or initiate a transfer information for the WLAN transmission.

The WLAN scheduler 332 and the BLE communicator 334 may be coupled to one another wirelessly. Stated differently, the system 330 may be free of physical connection (e.g., I/O bus) between the WLAN scheduler 332 and the BLE communicator 334. In some examples, the WLAN scheduler may be 802.11ax-based scheduler.

In some examples, the BLE sequence generator 336 may generate an initial seed of a pseudo random generator. Upon generating the initial seed, the BLE sequence generator 336, via the pseudo random generator, may generate a pseudorandom sequence that may be utilized, by the BLE communicator 334, for the BLE signal transmission. The initial seed may also be communicated to the WLAN scheduler 332.

In some examples, the WLAN scheduler 332 may utilize the initial seed received from the BLE communicator such that the same pseudorandom sequence (e.g., being utilized, by the BLE communicator 334, for the BLE signal transmission) may be generated at the WLAN scheduler 332. As described herein, the pseudorandom sequence may be an order of channels on which a BLE signal may be sequentially transmitted.

In some examples, the WLAN scheduler 332 may adjust, responsive to a known pattern of a BLE signal, a channel for the WLAN transmission such that an interference between the WLAN transmission and the BLE signal transmission may be avoided. The known pattern of the BLE signal may refer to a pattern of the BLE signal in relation to a channel to be occupied by the BLE signal, and the WLAN scheduler 332 may generate the known pattern at least based on the pseudorandom sequence (e.g., generated from the initial seed received from the BLE communicator 334).

The known pattern of the BLE signal may be generated from a variety types of information in addition to the pseudorandom sequence. For example, the known pattern may be generated from information associated with a connection among a plurality of BLE devices (e.g., BLE communicators) including the BLE communicator 334.

In some examples, the information may include a connection interview, which may indicate how often the BLE signal may be transmitted among the plurality of BLE devices. For example, a central BLE device among the plurality of BLE devices may set a connection interval and periodically request, based on the set connection interval, particular data (e.g., information) and/or information from a peripheral BLE device. The information including the connection interview may further indicate a range within the connection may be set. For example, the connection interval may be set between 7.5 milliseconds (ms) and 4 seconds.

In some examples, the information may include a slave latency associated with the connection among a plurality of BLE devices. For example, the information including the slave latency may include whether the slave latency is set or not, and/or a number of times one BLE device (e.g., a peripheral BLE device) may choose not to answer (e.g., to a request of a central BLE device).

In some examples, the information may include a timeout value associated with the connection among the plurality of BLE devices. As used herein, the timeout value may refer to a duration during which one of the plurality of BLE devices may have to wait until receiving a BLE signal from another one of the plurality of BLE devices prior to a termination of the connection.

In some examples, the system 330 may determine that the WLAN transmission has a priority over the BLE signal transmission on a particular channel. In this event, rather than performing the WLAN transmission based on the known pattern, the system 330 (e.g., BLE communicator 334) may generate a BLE channel map indicating that the particular channel is reserved for the WLAN transmission. Upon generating the BLE channel map, the system 330 (e.g., BLE communicator 334) may transmit the BLE channel map to other BLE devices such that the particular channel is not to be occupied by BLE signals while the particular channel is being utilized for the WLAN transmission.

Figure 4:
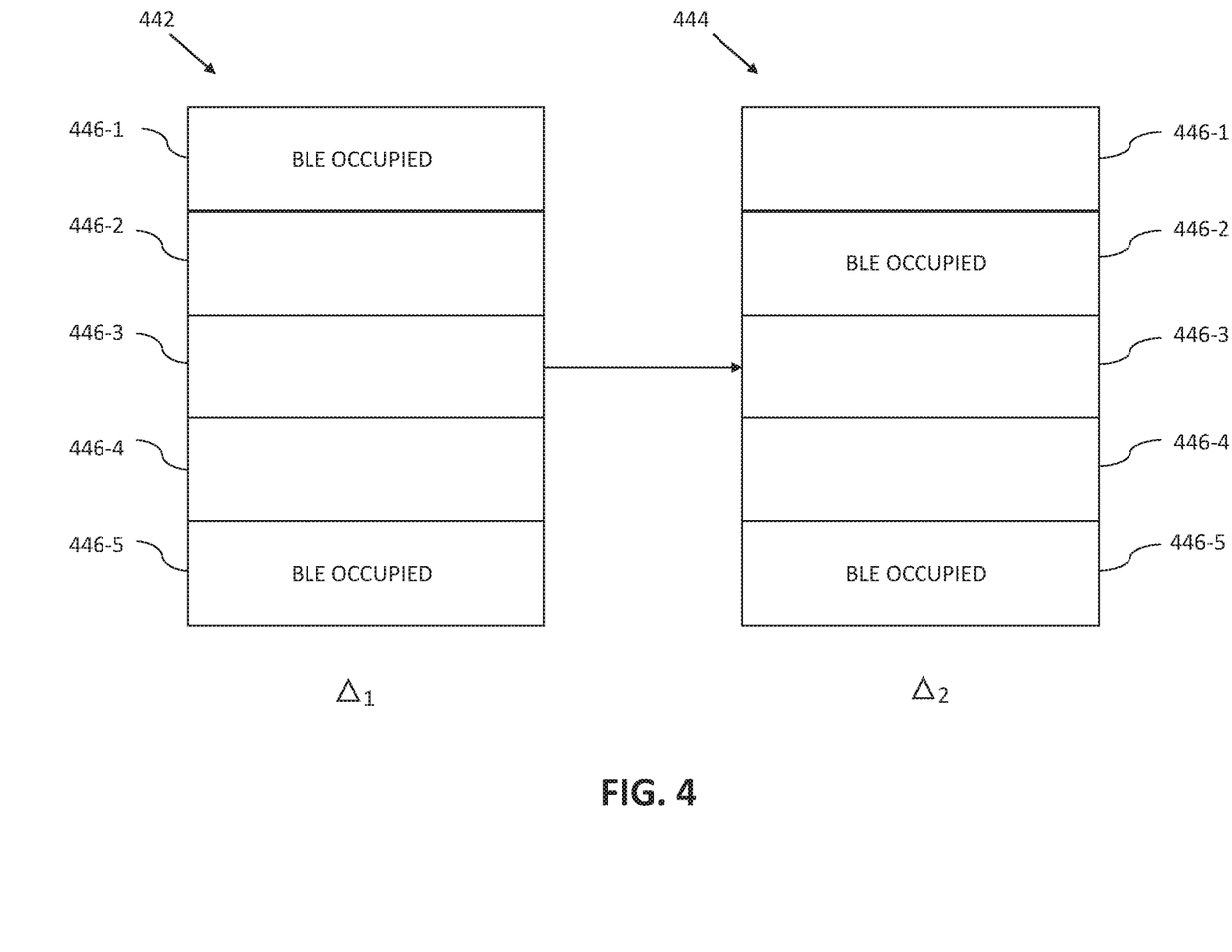
FIG. 4 illustrates a diagram of an example of utilizing a BLE signal pattern consistent with the present disclosure.

FIG. 4 illustrates a diagram of an example of utilizing BLE signal patterns consistent with the present disclosure. A state (442, 444) of a plurality of channels 446 indicates which channels are, over a particular duration, occupied and/or to be occupied by BLE signals. For example, a first state 442 of the plurality of channels 446 may indicate which channels are occupied and/or to be occupied over a first duration Δ1. For example, a second state 444 of the plurality of channels 446 may indicate which channels are occupied and/or to be occupied over a second duration Δ2. The second duration Δ2 may be a duration continuously subsequent to the first duration Δ1.

As described herein, in adjusting and/or selecting a channel for a WLAN transmission, a known pattern of BLE signals may be utilized to determine which channels are to be occupied by the BLE signals. The known pattern may be generated at least from a pseudorandom sequence that a BLE communicator utilizes for communicating with another BLE communicator.

Over the first duration Δ1, a known pattern may indicate that channels 446-1 and 446-5 are to be occupied by BLE signals. As such, responsive to the known pattern, a WLAN transmission may be performed among channels that are not to be occupied by the BLE signals. For example, over the first duration Δ1, channels 446-2, 446-3, and 446-4 may be utilized for the WLAN transmission as the known pattern of the BLE signals indicates that those channels are not to be occupied by the BLE signals over the first duration Δ1.

Over the second duration Δ2, a known pattern may indicate that channels 446-2 and 446-5 are to be occupied by BLE signals. As such, responsive to the known pattern, a WLAN transmission may be performed among channels that are not to be occupied by the BLE signals. For example, over the second duration Δ2, channels 446-1, 446-3 and 446-4 may be utilized for the WLAN transmission as the known pattern of the BLE signals indicates that those channels are not to be occupied by the BLE signals over the second duration Δ2.

The known pattern indicating a sequence of channels over the first duration Δ1 and the second duration Δ2 may be generated even prior to channels being occupied by BLE signals according to the known pattern. That is, the known pattern is indicatable not only of which channels are currently occupied, but also of which channels are to be occupied (e.g., though not currently occupied).

In the foregoing detailed description of the present disclosure, reference is made to the accompanying drawings that form a part hereof, and in which is shown by way of illustration how various examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

As used herein, designators such as "N", etc., particularly with respect to reference numerals in the drawings, can, for example, indicate that a number of the particular feature so designated can be included. As used herein, "a number of" a particular thing can, for example, refer to at least one of such things. A "plurality of" is intended to refer to more than one of such things. Multiple like elements may be referenced herein generally by their reference numeral without a specific identifier at the end.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

What is claimed:

1. A system, including:
   a Bluetooth low energy (BLE) communicator including a BLE sequence generator to generate an initial seed of a pseudo random generator; and
   a computing system including a wireless local area network (WLAN) scheduler, the computing system being distinct and separate from the BLE communicator, the computing system to:
     receive a wireless signal from the BLE communicator, the signal including the initial seed;
     utilize the initial seed received from the BLE communicator to generate a first sequence of channels in a radio band from the initial seed, wherein the first sequence of channels is an order of channels on which a BLE signal is to be sequentially transmitted; and
     generate by the WLAN scheduler, based at least in part on the first sequence generated from the initial seed, a second sequence of channels in the radio band for a WLAN transmission such that interference between the WLAN transmission and a BLE signal transmission is avoided by utilizing channels for WLAN transmission that are not scheduled for BLE transmission.

2. The system of claim 1, wherein the system does not include a physical connection between the BLE communicator and the computing system.

3. The system of claim 1, wherein the BLE communicator is a first BLE device wirelessly coupled to a second BLE device for the BLE signal transmission.

4. The system of claim 1, wherein the BLE sequence generator is a BLE frequency-hopping spread spectrum (FHSS) sequence generator.

5. The system of claim 1, wherein the WLAN scheduler is an IEEE 802.11ax-based scheduler.

6. The system of claim 1, wherein the computing system comprises a wireless access point.

7. A computing system, including:
   a processing resource;
   a wireless local area network (WLAN) scheduler; and
   a memory resource storing machine readable instructions to cause the processing resource to:
     receive a wireless signal from a Bluetooth low energy (BLE) communicator, the computing system being distinct and separate from the BLE communicator, the signal including an initial seed of a pseudo random generator;
     utilize the initial seed received from the BLE communicator to generate a first sequence of channels in a radio band from the initial seed, wherein the first sequence of channels is an order of channels on which a BLE signal is to be sequentially transmitted; and
     generate by the WLAN scheduler, based at least in part on the sequence generated from the initial seed, a second sequence of channels in a radio band for a WLAN transmission such that an interference between the WLAN transmission and a BLE signal transmission is avoided by utilizing channels for WLAN transmission that are not scheduled for BLE transmission.

8. The computing system of claim 7, wherein there is no physical connection between the BLE communicator and the computing system.

9. The computing system of claim 7, wherein the BLE communicator is a first BLE device wirelessly coupled to a second BLE device for the BLE signal transmission.

10. The computing system of claim 7, wherein a BLE sequence generator of the BLE communicator is a BLE frequency-hopping spread spectrum (FHSS) sequence generator.

11. The computing system of claim 7, wherein the WLAN scheduler is an IEEE 802.11ax-based scheduler.

12. The computing system of claim 7, wherein the computing system comprises a wireless access point.

13. A non-transitory machine-readable storage medium having stored thereon machine-readable instructions to cause a processor to:
    receive, at a computing system, a wireless signal from a Bluetooth low energy (BLE) communicator, the computing system being distinct and separate from the BLE communicator, the signal including an initial seed of a pseudo random generator;
    utilize the initial seed received from the BLE communicator to generate a first sequence of channels in a radio band from the initial seed, wherein the first sequence of channels is an order of channels on which a BLE signal is to be sequentially transmitted; and
    generate, based at least in part on the sequence generated from the initial seed, a second sequence of channels in the radio band for a WLAN transmission such that an interference between the WLAN transmission and a BLE signal transmission is avoided by utilizing channels for WLAN transmission that are not scheduled for BLE transmission.

14. The medium of claim 13, wherein there is no physical connection between the BLE communicator and the computing system.

15. The medium of claim 13, wherein the BLE communicator is a first BLE device wirelessly coupled to a second BLE device for the BLE signal transmission.

16. The medium of claim 13, wherein a BLE sequence generator of the BLE communicator is a BLE frequency-hopping spread spectrum (FHSS) sequence generator.

17. The medium of claim 13, wherein generating second sequence of channels including application of an IEEE 802.11ax-based scheduler.

* * * * *